Aug. 8, 1967  R. F. WRENCH  3,334,393
CUTTING TOOL
Filed June 3, 1965

INVENTOR.
Robert F. Wrench

BY *Burton R. Turner*

ATTORNEY

United States Patent Office 3,334,393
Patented Aug. 8, 1967

3,334,393
CUTTING TOOL
Robert F. Wrench, Corning, N.Y., assignor to Corning Glass Works, Corning, N.Y., a corporation of New York
Filed June 3, 1965, Ser. No. 461,069
3 Claims. (Cl. 29—78)

This invention relates to an abrading or cutting tool and the method of making the same, and more particularly to an inexpensive easily reproducible tool for forming a predetermined textured design on the surface of an article through the removal of selected portions of such surface.

In the past, it has been customary to hand-craft textured designs in culinary articles, such as pottery and earthenware. One of the main disadvantages of such hand-crafted work is the fact that it is virtually impossible to continually reproduce an identical design on a plurality of ware pieces, and of course mass production of such ware articles is not feasible. The type of textured surface decoration referred to above and contemplated by the instant invention, is directed to a texturing by selective removal of an outer surface portion of an article to provide the texturing, and not the well-known substantially smooth-surfaced reproducible methods of stenciling and decaling.

The novel tool of the present invention incorporates a plurality of abrading or cutting elements arranged in a predetermined positionment, which are fixedly embedded at one end within a mounting base member. The abrading or cutting elements are formed from pre-cut flexible wire, and their particular relative orientation or spaced positionment along a desired alignment, represents the desired textured design to be repeatably reproduced by such abrading members.

Further, the method of forming such tools facilitates an easy reproduction of numerous tools at a low cost. In essence, a plurality of pre-cut wires are supplied to a master plate having a plurality of machined parallel grooves arranged in a desired positionment along an alignment, which is representative of the decoration to be formed by the tool. A wire is retained in each groove along the master plate, and the plurality of wires is then blocked so that their operating ends are in alignment and terminate in a common plane. A longitudinal strengthening and position-retaining band is then positioned over the wires retained in the master plate, a short distance from their operating ends. The master plate with the wires secured thereto is then positioned within a mold, and the ends of such wires opposite their operating ends are embedded within a thermoplastic material.

It thus has been an object of the invention to provide an inexpensive abrading or cutting tool which may be easily formed to produce a desired textured design on culinary articles.

A further object of the invention has been to provide a wire-like tool for repeatably removing desired surface portions of a culinary article so as to produce a plurality of such articles having identical textured surface decorations.

An additional object of the invention has been to provide a simple and inexpensive method of forming abrasive or cutting tools provided with a predetermined configuration, so as to produce a desired textured design on the surface of work articles to which they are applied.

These and other objects of the invention will be more apparent to those skilled in the art from the following disclosure and accompanying drawings in which:

FIGURE 2 is a further embodiment of an abrasive or cutting tool embodying the invention, particularly adapted for use on curvilinear wall portions such as bowls and the like;

Figure 1:
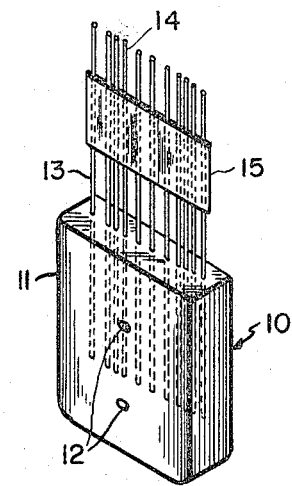
FIGURE 1 is a perspective view of one form of an abrasive or cutting tool embodying the invention for use on substantially straight wall articles.

Referring now to the drawings, and particularly FIGURE 1, an abrading or cutting tool is shown at 10. The tool 10 has a thermoplastic body portion 11 provided with a pair of aligning pin-receiving holes or mounting recesses 12 formed in its front face. A plurality of abrading or cutting elements 13 have one end embedded within the body portion 11, and an operating end 14 projecting outwardly therefrom. As shown, the abrading or cutting elements 13 are in linear alignment along the longitudinal extend of the body portion 11, and their upper ends 14 terminate in a common plane. The elements 13 are preferably formed of flexible small diameter steel wire, such as piano wire.

It is imperative that the wire-like abrading or cutting elements 13 have sufficient flexibility so as to compensate for out-of-roundness, distortion, and other ware tolerances, while maintaining constant contact with the ware article. However, since the operating ends 14 must track on the ware article so as to produce a continuous uniform design, it is equally imperative that the elements 13 do not flex along their alignment relative to each other.

In order to maintain rigidity between the spacing of the elements, a longitudinal strengthening and position-retaining band 15 is positioned on the elements 13 intermediate their operating ends 14 and the body portion 11. Preferably, the band 15 has an adhesive on one face thereof and completely encircles the aligned longitudinal extent of the elements 13. As a result, the elements 13 are free to flex, either individually or as a unit, laterally of the body portion 11, i.e., in a direction from front to back of the body portion, so as to compensate for ware tolerances in the workpiece to which they are applied. However, the band 15 prevents the elements 13 from flexing relative to each other in a longitudinal direction, i.e., in a direction from side to side of the body portion 11, so that the elements will constantly track when applied to a ware article.

Figure 2:
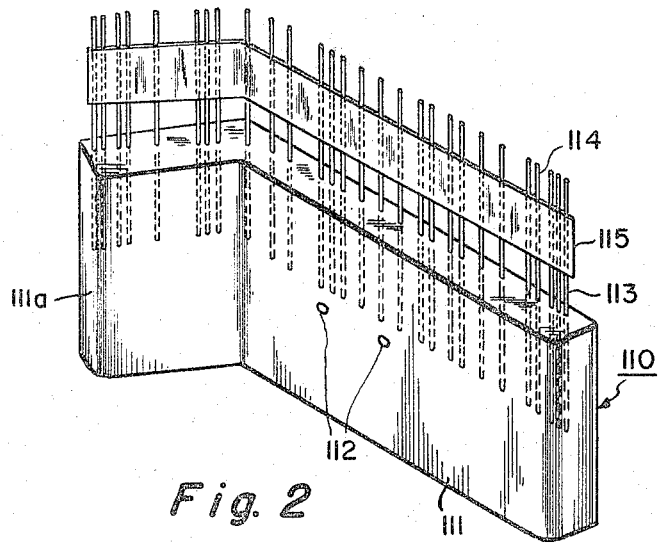

Referring now to FIGURE 2, a further tool embodiment of the invention is shown at 110. It is similar in virtually all respects to the embodiment of FIGURE 1, and has a body portion 111 provided with a pair of aligning pin-receiving holes or mounting recesses 112, a plurality of abrading or cutting elements 113 embedded at one end within the body portion 111 and having outwardly projecting operating ends 114, and is provided with a longitudinal strengthening and position-retaining band 115. However, the body portion 111 has an angularly offset end portion 111a, and the abrading or cutting elements 113 are arranged in a curvilinear alignment for facilitating application to curvilinear surface portions to be decorated such as bowls and the like.

Figure 3:
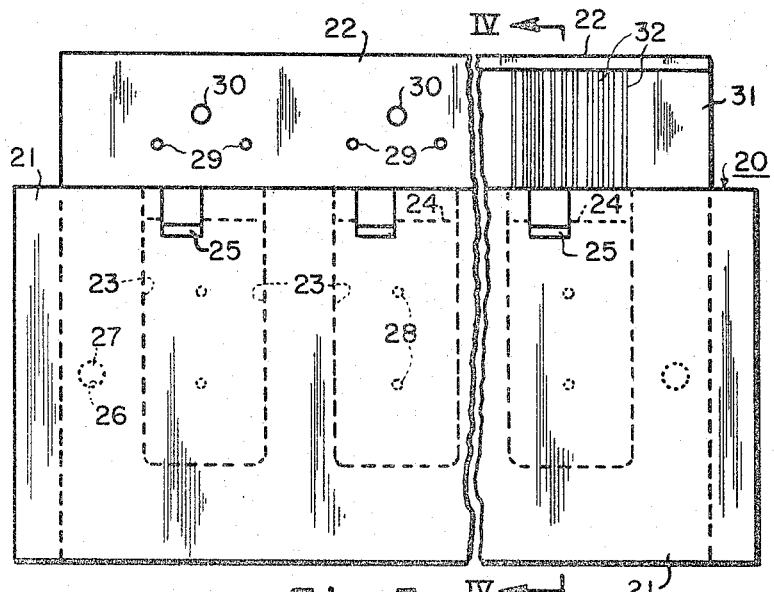
FIGURE 3 is a fragmental front elevational view of a mold utilized to produce the tool shown in FIGURE 1, and illustrates a portion of the grooved master plate in position on the mold.
Figure 4:
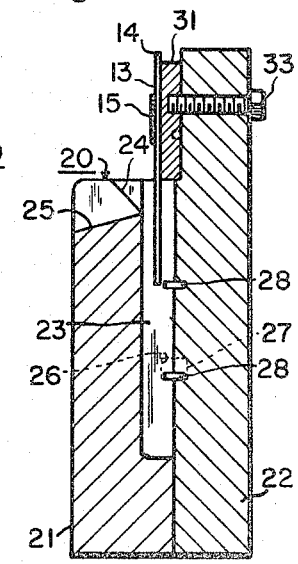
FIGURE 4 is a side elevational view in section taken along line IV—IV of the mold shown in FIGURE 3, but with the wires held in position upon the master plate by a retaining band; and, FIGURE 5 is a top plan view of the mold shown in FIGURE 3.
Figure 5:
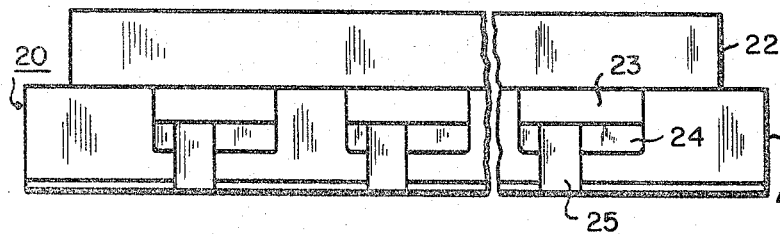

Referring now to FIGURES 3, 4, and 5, a mold for forming a plurality of tools 10 is shown at 20. The mold has a forward cavity plate 21 and a rear backup plate 22. The cavity plate 21 is provided with at least one mold cavity 23 having a tapered fill opening 24 communicating with an upper surface of the cavity plate 21 for facilitating the filling of such cavity with a molten or thermoplastic material. An overflow opening 25 also communicates with each mold cavity 23 and a forward face of the cavity plate 21 to limit the height of material retained within the mold cavity 23, and provides a run-off for excess material. A pair of guide recesses 26 are formed in the mold cavity plate 21 adjacent the backup plate 22 to receive alignment or dowel pins 27 which function to correctly align the plates during assembly.

The backup plate 22 is provided with a pair of dowels or pins 28 which project into each mold cavity 23, so as to form the mounting recesses 12. The upper portion of backup plate 22 has a plurality of guide pins 29 and openings 30 for mounting a master plate 31 having a plurality of parallel machined grooves 32 formed at predetermined intervals in its forward face. The guide pins 29 are cooperably received in rear portions of the master plate 31 to alignably position the plate on the mold, and a screw 33 passes through the openings 30 to operably engage the master plate and retain it upon the mold assembly.

In operation, a plurality of wires 13 are rolled into the grooves 32 of master plate 31 so as to laterally space the wires 13 in a predetermined orientation, commensurate with the design to be formed upon a ware article. The operating ends 14 of the wire 13 are then blocked so as to be in alignment and terminate in a common plane. A strengthening and position-retaining band 15 is then placed across the aligned wires 13 in spaced-apart relation from the operating end 14. The master plate 31, having the aligned wires 13 retained thereon, is then securely positioned on backup plate 22, and mold cavity plate 23 secured to backup plate 22 by any suitable means, such as C-clamps.

Preferably, the mold cavities are treated with a mold release agent and a molten or thermoplastic material is poured downwardly within tapered fill opening 24 so as to flow into and fill mold cavity 23. When it reaches a predetermined upper level excess material overflows from the cavity through overflow openings 25. The molten or thermoplastic material, which may be an epoxy plastic, is allowed to set and cure at which time the spaced wires 13 become fixedly embedded within the set material, which now forms body portion 11 of the tool 10. Also, the dowels or pins 28 which project into the cavity 23 from backup plate 22 function to form the aligning pin-receiving holes or mounting recesses 12 in the front face of the body portion 11, which positively reference the tools in their tool holders for ready interchangeability.

The backup plate and mold cavity plate are open and the formed tool released therefrom and from the master plate. Outer ends of the band 15 are preferably brought about the opposite side of the wire-like abrading or cutting elements 13 so as to completely encircle their longitudinal extent. If desired, after curing, the operating ends of the cutting elements may be ground to insure that they are in alignment and terminate in a common plane.

Although the now preferred embodiment of the invention has been shown and described in detail, various changes and modifications may be made thereto without departing from the spirit and scope thereof as defined in the appended claims.

I claim:

1. An improved abrading and cutting tool for selectively removing surface portions of ware articles to produce a desired textured design thereon which comprises, a solid body portion, a plurality of flexible wire-like cutting elements having one end embedded within said body portion, said cutting elements having an outer operating end terminating in a common plane, said wire-like cutting elements being positioned along a single line with unequal longitudinal spacing therebetween, and means intermediate said solid body portion and the operating ends of said wire-like cutting elements for facilitating independent flexible movement of said cutting elements in a direction normal to a plane which passes through their axes and extends along their longitudinal extent while simultaneously inhibiting flexible movement of said cutting elements relative to one another within such plane.

2. An improved tool as defined in claim 1 wherein said flexible wire-like cutting elements are embedded within said solid body portion along a single curvilinear line.

3. An improved tool as defined in claim 1 wherein said solid body portion is formed of a thermoplastic material which surrounds said one end portion of each of said cutting elements to retain each such element in predetermined spaced-apart relationship within said solid body portion.

References Cited

UNITED STATES PATENTS

| | | | |
|---|---|---|---|
| 1,480,433 | 1/1924 | Goen | 25—1 |
| 2,529,012 | 11/1950 | Gleekman | 15—236 X |
| 2,716,314 | 8/1955 | Upham. | |
| 2,769,192 | 11/1956 | Satzinger | 15—169 |
| 2,857,607 | 10/1958 | South | 15—104 |

HARRISON L. HINSON, *Primary Examiner.*